June 15, 1926.
W. MOORE
BATHER'S LIFE SAVING BUOY
Filed Dec. 8, 1925
1,588,798
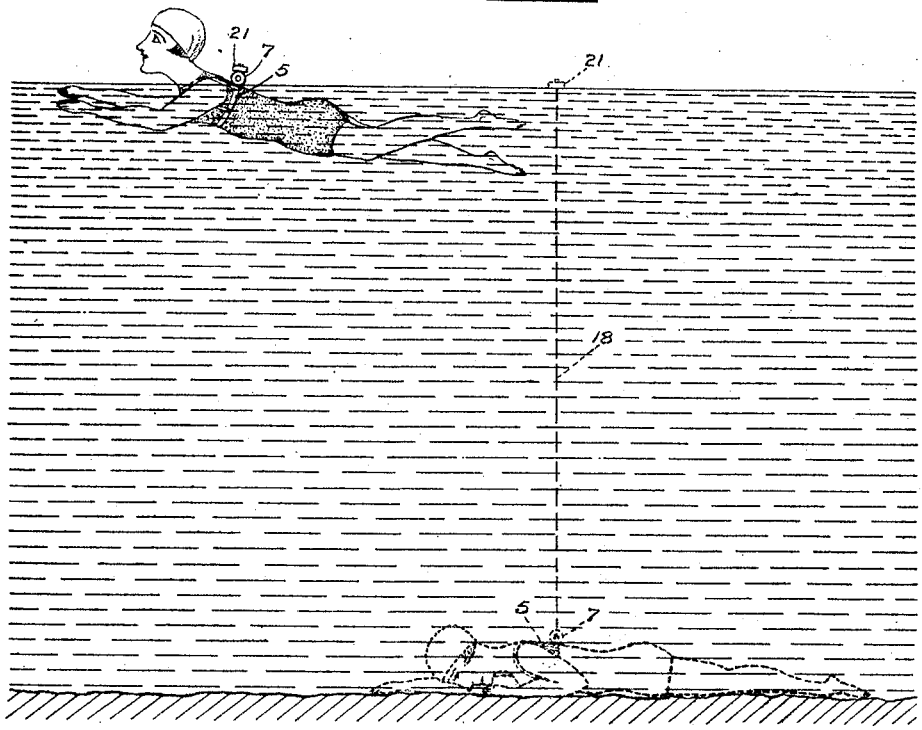
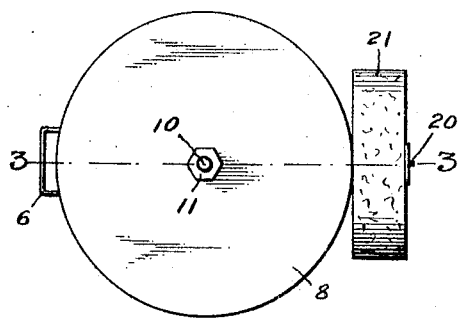
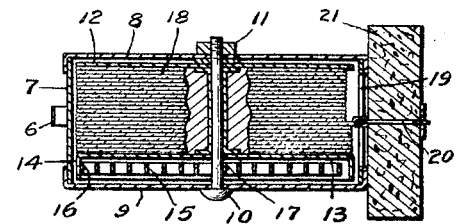
INVENTOR
William Moore
BY
John W. Maupin,
ATTORNEY Patented June 15, 1926.

1,588,798

UNITED STATES PATENT OFFICE.

WILLIAM MOORE, OF SEATTLE, WASHINGTON.

BATHER'S LIFE-SAVING BUOY.

Application filed December 8, 1925. Serial No. 73,998.

My invention relates to bathers' life saving buoys and the principal objects of the invention are to provide a buoy comprising a float attached by a line to a self winding spring actuated reel fastened to the bather's body that will normally retain the line in a wound position with said float in close proximity to the bather while at the surface of the water and whereby the buoyancy of the float will overcome the tension of the spring causing the line to unwind and the float to remain on the surface of the water when the bather's body is submerged. Thus the float will serve as a means of locating the body and the line as a means of raising the body to the surface in case of drowning. Other objects are to provide a bather's life saving buoy that is simple and durable in construction, reliable and efficient in operation, and which may be manufactured at comparatively small cost.

The invention comprises further features and combination of parts, as hereinafter set forth, shown in the drawings and pointed out in the claim.

In the drawings:

Figure 1 is a view showing in full lines the position of the buoy attached to the person of the bather when at the surface of the water, and in dotted lines the relative position of same when the bather is submerged;

Fig. 2 is an enlarged view of the device in side elevation; and

Fig. 3 is a view in vertical section taken substantially on a broken line 3, 3 of Fig. 2.

Referring more especially to the drawings, the numeral 5 designates a belt that may be of any desired form and which may be fastened around any part of the bather's body. Said belt is slipped through a guide 6 that may be brazed or otherwise fixed to the casing 7 of the reel. Said reel casing is provided with side closure members 8 and 9, one or both of which may be detachable if desired. A bolt or stud shaft 10 passes centrally through said reel casing and may be held by a nut 11.

Revolubly mounted on the shaft 10 within the casing is a reel drum 12 one of whose sides 13 is provided with a flange 14 in order to form a housing for a spring 15 spirally disposed therein with one end fastened at 16 to said flange and the other end secured to said shaft at 17. A line 18 is wound upon said drum 12 with its inner end secured thereto and its outer end passing through a slot 19 in the casing 7. Said outer end is tied to a small eyebolt 20 secured through the center of a cork float 21.

It will be understood that the tension of the spring 15 is adapted to normally retain the line 18 in the wound position with the float 21 in contact with the casing 7 at all times when the reel is above the water. It will also be understood that said float is of such size that its resistant buoyancy will overcome the tension of the spring causing the line 18 to unwind and the float 21 to remain on the surface of the water at all times when said reel is submerged.

Thus it will be manifest that when the reel is secured by means of the belt 5 to the body of the bather and in cases of drowning the float 21 will serve as a buoy to mark the spot above the body as shown in dotted lines in Fig. 1 of the drawings. The line 18 is small and strong enough to raise the body to the surface. It will now be apparent that I have provided means whereby the bodies of submerged persons may be readily located and raised to the surface of the water in ample time for resuscitation.

The drawings and description are merely intended as an illustration in disclosing one means of reducing my principle to practice and it will be understood that I reserve the right to make such minor changes therein as will not depart from the scope and spirit of the invention.

Having thus described my invention, what I claim and desire to secure by Letters Patent of the United States is:

A bather's life saving buoy comprising a casing, means for securing said casing to a person's body, a reel revolubly mounted within the casing, a line windingly secured on said reel, a float attached to the line, a helical spring adapted to retain said line and float in the wound position when said reel is above the water, and said buoy adapted to overcome the tension of the spring and cause the line to unwind permitting the float to rest on the surface of the water when the person's body is submerged.

In witness whereof I hereunto subscribe my name this 2nd day of December A. D. 1925.

WILLIAM MOORE.